United States Patent
Pinhasov et al.

(10) Patent No.: US 9,414,091 B2
(45) Date of Patent: Aug. 9, 2016

(54) VIDEO ENCODER WITH AN INTEGRATED TEMPORAL FILTER

(75) Inventors: Eran David Pinhasov, Zichron Yaakov (IL); Yuri Dolgin, Nesher (IL); Victor Pinto, Zichron Yaakov (IL)

(73) Assignee: Qualcomm Incorporated, San Diego, CA (US)

( * ) Notice: Subject to any disclaimer, the term of this patent is extended or adjusted under 35 U.S.C. 154(b) by 738 days.

(21) Appl. No.: 12/511,777

(22) Filed: Jul. 29, 2009

(65) Prior Publication Data
US 2010/0027665 A1 Feb. 4, 2010

Related U.S. Application Data

(60) Provisional application No. 61/085,518, filed on Aug. 1, 2008.

(51) Int. Cl.
*H04N 19/615* (2014.01)
*H04N 19/82* (2014.01)
*H04N 19/61* (2014.01)
(Continued)

(52) U.S. Cl.
CPC .............. *H04N 19/82* (2014.11); *H04N 19/117* (2014.11); *H04N 19/182* (2014.11); *H04N 19/61* (2014.11)

(58) Field of Classification Search
CPC .................... H04N 7/26585; H04N 19/00787
See application file for complete search history.

(56) References Cited

U.S. PATENT DOCUMENTS 5,539,663 A 7/1996 Agarwal
6,122,314 A 9/2000 Bruls et al.
7,627,040 B2 * 12/2009 Woods et al. ............ 375/240.26
(Continued)

FOREIGN PATENT DOCUMENTS

CN 1669326 A 9/2005
CN 1717937 A 1/2006
(Continued)

OTHER PUBLICATIONS

Song, B.C. et al., Motion-Compensated Temporal Filtering for Denoising in Video Encoder, Electronics Letters, IEE Stevenage, GB, vol. 40 No. 13, pp. 802-804, Jun. 24, 2004.
(Continued)

*Primary Examiner* — Christopher Findley
(74) *Attorney, Agent, or Firm* — Knobbe, Martens, Olson & Bear, LLP

(57) ABSTRACT

A video encoder with an integrated temporal filter, which has an output carrying a sequence of encoded frames, includes: an input receiving input frame data; a temporal filter receiving the input frame data from the input and producing filtered frame data; motion processing modules receiving reconstructed frames derived from the sequence of encoded frames and the filtered frame data from the temporal filter and producing a residual error signal output; and a coder module which receives the input frame data and the residual error signal and produces the sequence of encoded frames. A method of encoding video includes: receiving a current frame to be encoded into a motion estimator and a temporal filter substantially at one time; receiving a previously encoded reference frame; generating a reconstructed motion-compensated reference frame from the previously encoded reference frame; and determining from the motion-compensated reference frame and the current frame whether and how much blending to perform between the motion compensated reference frame and the current frame.

15 Claims, 7 Drawing Sheets

(51) Int. Cl.
*H04N 19/117* (2014.01)
*H04N 19/182* (2014.01)

(56) References Cited

U.S. PATENT DOCUMENTS

| | | | |
|---|---|---|---|
| 7,751,484 B2 * | 7/2010 | Jia et al. | 375/240.29 |
| 7,889,793 B2 * | 2/2011 | Han et al. | 375/240.16 |
| 7,944,975 B2 * | 5/2011 | Cha | 375/240.25 |
| 2003/0053709 A1 | 3/2003 | Olivieri | |
| 2003/0202597 A1 | 10/2003 | Turaga et al. | |
| 2007/0086675 A1 | 4/2007 | Chinen et al. | |
| 2008/0063064 A1 * | 3/2008 | MacInnis et al. | 375/240.16 |
| 2009/0016451 A1 | 1/2009 | Chen | |

FOREIGN PATENT DOCUMENTS

| | | |
|---|---|---|
| JP | H09187008 A | 7/1997 |
| JP | H11504490 A | 4/1999 |
| JP | 2002535895 A | 10/2002 |
| JP | 2008011117 A | 1/2008 |
| JP | 2010-070731 A | 4/2010 |
| JP | 2011-504490 A | 2/2011 |
| KR | 20070035405 A | 3/2007 |
| WO | 9730545 A1 | 8/1997 |
| WO | WO-0277909 A1 | 3/2002 |
| WO | 03007119 A2 | 1/2003 |
| WO | 03007119 A3 | 1/2003 |
| WO | 2004049723 A1 | 6/2004 |
| WO | 2009064126 A1 | 5/2009 |
| WO | WO-2009137652 A1 | 11/2009 |

OTHER PUBLICATIONS

Song, B.C. et al., Motion-Compensated Noise Estimation for Efficient Pre-Filtering in a Video Encoder, Proceedings 2003 International Conference on Image Processing, ICIP-2003., Barcelona, Spain., Sep. 14-17, 2003, IEEE, New York, NY, US. vol. 2, pp. 211-214, Sep. 14, 2003.

English Translation of Office Action from Chinese Application No. 200980123913 dated Jul. 30, 2012.

English Translation of Search Report from Chinese Application No. 200980123913 dated Jul. 30, 2012.

Office Action from JP 2011-521302 dated Feb. 21, 2013.

International Search Report and Written Opinion—PCT/US2009/052166—ISA/EPO—Nov. 2, 2009.

* cited by examiner

VIDEO ENCODER WITH AN INTEGRATED TEMPORAL FILTER

RELATED APPLICATIONS

This application claims priority under 35 U.S.C. §119(e) to U.S. Provisional Application Ser. No. 61/085,518, entitled "A VIDEO ENCODER WITH AN INTEGRATED TEMPORAL FILTER," filed on Aug. 1, 2008, which is herein incorporated by reference in its entirety.

BACKGROUND OF INVENTION

1. Field of Invention

The present invention relates generally to the field of encoding video data, and more particularly to using an integrated temporal filter in systems and methods for encoding video data.

2. Discussion of Related Art

Conventional systems and methods of encoding video data in compact digital formats are implemented as special purpose integrated circuits and/or systems of integrated circuits which perform various types of signal processing, as software executing on a special-purpose processor or as software executing on a general-purpose processor.

Digital video signals are representations as currents and voltages within a digital circuit of digital values (conventionally a sequence of binary digits, i.e., bits, organized as bytes, words, picture elements, frames, etc.) that ultimately are decoded to describe the hue, color saturation and luminance of every picture element (pixel) in a sequence of frames. Modern digital video signals have been designed to represent moving sequences of very high resolution frames. Because such sequences of very high resolution frames would require very high bandwidths, i.e., information-carrying capacity, to transmit the large volume of information represented from a source to a display, modern systems encode or compress the signal for transmission.

Digital compression and motion compensation techniques can drastically reduce the required video channel bandwidth. Conventional video codecs encode sequences of frames by, among other functions after performing motion compensation, comparing the last frame sent to the current frame and take the difference.

A conventional temporal filter configuration and a conventional video codec are shown in the block diagrams of FIGS. 6 and 7, respectively.

In brief, the conventional temporal filter configuration, as shown in the block diagram of FIG. 6, receives input frame data 101 into a motion estimation and motion compensation module 603. Input frame data 101 is also received by temporal filter 605 and stored in a memory 606 of old frames. Memory 606 of old frames may hold frames either prior to temporal filtering (i.e., input frame data 101) or after temporal filtering (alternate data path 607), for example using an infinite impulse response (IIR) temporal filter, but in either case the frames are older than the current frame to be operated upon. Old frames are retrieved from the memory 606 during operation of the motion estimation and motion compensation module 603, since old frames form the basis for the estimation and compensation.

In a full-fledged, conventional video codec, as shown in the block diagram of FIG. 7, input frame data 101 is received into a motion estimation and motion compensation module 703, while also being received into a residual calculation module 707. The residual calculation module 707 calculates the difference between a motion-compensated old frame and the actual current frame, referred to as the residual error. The residual error is then encoded by the transform/quantization/entropy coding module 709. The encoded residual error is fed back and decoded by reconstruction module 711, with reference to the old frame. The reconstructed frame is stored in memory 713, for access by the motion estimation and motion compensation module 703. The reconstructed frame retrieved from memory 713 is used for motion estimation and compensation done by module 703.

SUMMARY OF INVENTION

A video encoder with an integrated temporal filter, which has an output carrying a sequence of encoded frames, includes: an input receiving input frame data; a temporal filter receiving the input frame data from the input and producing filtered frame data; a motion processing module receiving a reconstructed frame derived from the sequence of encoded frames and the filtered frame data and producing a residual error signal output; and a coder module which receives the input frame data and the residual error signal and produces the sequence of encoded frames. In one variation, the motion processing module further includes: a motion estimation module which receives the reconstructed frame and the input frame data, and which produces estimated motion vectors; and a motion compensation module which receives the estimated motion vectors and produces motion compensated frame data; wherein the temporal filter further receives the motion compensated frame data for filtering. In another variation, the encoder further includes: a frame reconstruction module receiving the sequence of encoded frames and providing the reconstructed frame to the motion estimation module. In yet another variation, the encoder further includes: a switch by which the temporal filter receives either the reconstructed frame provided to the motion estimation module or an alternately reconstructed frame.

A method of encoding video includes: receiving a current frame to be encoded into a motion estimation module and a temporal filter substantially simultaneously; temporally filtering the current frame; receiving a previously encoded frame; generating a reconstructed frame from the previously encoded frame; and determining from the reconstructed frame and the current frame whether and how much blending to perform between the reconstructed frame and the current frame. In one variation, the method includes: temporally filtering by blending using the reconstructed frame. In another variation, the method includes: selectively temporally filtering the current frame depending on either the reconstructed frame provided to the motion estimation module or an alternately reconstructed frame with no motion compensation.

According to other aspects of an embodiment, a video encoder includes: a motion compensation unit constructed and arranged to receive estimated motion vectors from a motion estimation unit; a residual calculation unit coupled to said motion compensation unit; and a temporal filter unit coupled to said motion compensation unit and enabled to receive a current video frame; the temporal filter unit enabled to determine a need for blending between a motion-compensated reference frame and said current video frame as well as a strength level of said blending. In a variation, the blending is performed up to pixel level.

Another method for video encoding of video frames includes: receiving a current video frame to be encoded; receiving a previously encoded reference frame; generating a motion-compensated reference frame from said previously encoded reference frame by using motion estimation and compensation; and, determining based on said motion-compensated reference frame and said current video frame whether blending is necessary and if so determine a strength of said blending. According to a variation, blending is performed up to pixel level.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In block diagrams showing both data and process flow, dashed lines indicate data-only flows, while solid lines indicate flows of both data and process. In the drawings.

DETAILED DESCRIPTION

Figure 1:
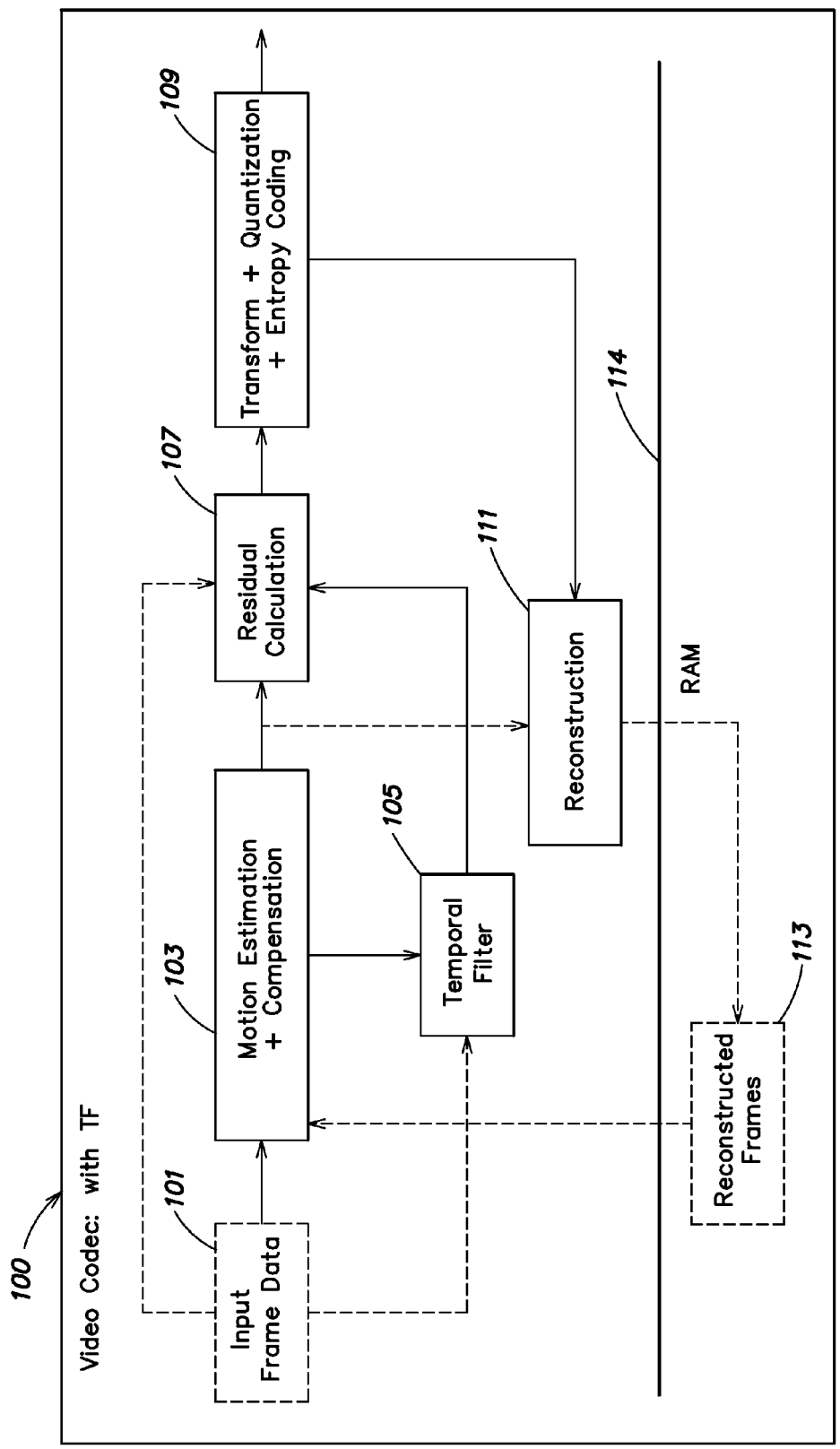
FIG. 1 is a block diagram of aspects of an embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Embodiments of aspects of the invention can be constructed around a digital signal processing feedback loop which encodes a stream of frames as a stream of bits called a digital video bit stream. Encoding involves performing motion estimation and motion compensation to predict the content of a current frame using a previously encoded frame (called a reference frame), which may have been reconstructed for purposes of performing this prediction. Differences between the predictions and the actual current frame are compressed and transmitted as the encoded information. In such a system, a current frame is received and compared to a reference frame to which motion estimation and compensation have been applied, to determine whether and how much motion has occurred that is different from the estimation and compensation, i.e., a residual difference. The residual difference is then encoded and quantized for output. The current frame is also, in the feedback path, decoded and reconstructed to form the reference frame for a next current frame. In order to remove noise which was not removed by spatial filtering if any, temporal filtering is employed.

Temporal filtering according to aspects of embodiments can be performed at one of a number of different stages in the system described. Characteristics of a selected stage at which to perform temporal filtering which have been found to be advantageous, but not all of which need be included in any one selected stage, include receiving the current frame using the same fetch as the motion estimation and/or compensation modules, and either performing the temporal filter operation on the current frame and providing the result to the residual calculation unit for final residual calculation or providing the decisions on the required blending to residual calculation unit, which performs both blending/interpolation and residual calculation at the same time.

The described structure is built of specialized or general-purpose hardware and/or software configured to form modules which perform specific functions on their inputs to produce outputs. Implementation of such individual modules, which will now be discussed, is well-known to skilled artisans. Similar modules are hardware and/or software elements of which conventional encoders are also constructed.

Motion Estimator

A motion estimator may be constructed as special-purpose digital logic circuits, as digital signal processing software executing on a digital signal processor (DSP) of sufficient speed and bandwidth, as a finite state machine or by any other suitable means. The motion estimator compares a current frame with one or more previous frames to estimate whether, where and/or how much motion may have occurred between the previous frames and the current frame. Motion is represented as vectors indicating the direction and magnitude of displacement of blocks of pixels or individual pixels from one frame to another.

Motion Compensator

A motion compensator may be constructed as special-purpose digital logic circuits, as digital signal processing software executing on a DSP of sufficient speed and bandwidth, as a finite state machine or by any other suitable means. The motion compensator applies the motion vectors to the reference frame to produce a motion compensated, predicted frame. The predicted frame may differ from the current frame, that difference being termed a residual error.

Residual Calculator

A residual calculator may be constructed as special-purpose digital logic circuits, as digital signal processing software executing on a DSP of sufficient speed and bandwidth, as a finite state machine or by any other suitable means. The residual calculator determines the difference, pixel-by-pixel, between the current frame and the predicted frame, which difference is what is then encoded into the digital video bit stream. Blending, guided by the temporal filter, can also be performed by the residual calculator.

Temporal Filter

A temporal filter may be constructed as special-purpose digital logic circuits, as digital signal processing software executing on a DSP of sufficient speed and bandwidth, as a finite state machine or by any other suitable means. The temporal filter removes temporal noise by determining to what extent blending, interpolation and/or other compensation techniques should be used. Temporal filtering compares and alters the rate of change of one or more pixels or sub-pixels over a period of time, as compared with spatial filtering which alters the rate of change of pixel or sub-pixel values over a line or region in space within a frame.

Blending, the exemplary technique described is a calculation that receives two or more input values, applies one or more blending parameters and produces at an output a scalar value which may, for example, be bounded between the input values. In embodiments where two or more input values are received, they can represent the same portion, e.g., the luminance value of corresponding pixels, of two or more frames. Alternatively, they can represent values within larger regions, e.g., the luminance values within corresponding 3×3 pixel regions, of two frames, combining temporal and spatial filtering effects. This process (for simplicity illustrated by the two-input case) may be represented by the equation: $O=f(A, B, bp_1, bp_2, \ldots bp_n)$; where A, B are input values;

$bp_1, bp_2, \ldots, bp_n$ are blending parameters (of which there may be an arbitrary number, n); and O is an output result in the range of: $A \leq O \leq B$, if $A \leq B$, and $B \leq O \leq A$, if $A > B$.

According to one model which has been tried, the blending function may be represented as: $O = bp_1 \times A + (1 - bp_1) \times B$.

Quantizer

A quantizer may be constructed as special-purpose digital logic circuits, as digital signal processing software executing on a DSP of sufficient speed and bandwidth, as a finite state machine or by any other suitable means. The quantizer takes the result of previous calculations which may have more significant digits or may include scale factors or the like, and reduces the result to one of a finite number of quanta, i.e. specific values that can be encoded.

De-quantizer

A de-quantizer may be constructed as special-purpose digital logic circuits, as digital signal processing software executing on a DSP of sufficient speed and bandwidth, as a finite state machine or by any other suitable means. The de-quantizer takes a sequence of quanta, and based on state information, other a priori information, interpolation or other techniques, and expands the values back to a sequence of values which may have more significant digits or may include scale factors or the like.

Transform/Inverse Transform

Various matrix operations, including transform/inverse transform operations may be required and may be constructed as special-purpose digital logic circuits, as digital signal processing software executing on a DSP of sufficient speed and bandwidth, as a finite state machine or by any other suitable means.

Coder

A coder may be constructed as special-purpose digital logic circuits, as digital signal processing software executing on a DSP of sufficient speed and bandwidth, as a finite state machine or by any other suitable means. Coders may perform various transformations of an input sequence of values to reduce the redundancy contained in the sequence of values, thereby compressing the sequence into a smaller number of values; to increase the redundancy contained in the sequence of values, thereby increasing resistance to errors in the sequence that may be introduced during transmission of the sequence; or, simply to translate one representation of information to another representation of that information. Some coders used in video processing include entropy encoders, transform encoders, such as Discrete Cosine Transform (DCT) encoders, and motion estimation and compensation encoders. In this discussion, the particular function of an encoder will be identified in context, and the words "coder" or "encoder" may not be used when the function alone provides clarity.

Aspects of an embodiment are now described with reference to FIG. 1. The components shown in FIG. 1 have been individually described above. Alternative constructions for each of these blocks are known to those skilled in the art.

Frames are captured by the system 100 and provided as input frame data 101 to a motion processing module 103 that performs motion estimation and motion compensation. The input frame data 101 is also provided to a temporal filter module 105 and a residual calculator module 107. The motion occurring between a previous frame and the input frame data 101 currently being processed is estimated and compensation applied to each pixel of the previous frame, producing a compensated frame which is provided, along with the input frame data 101 and temporally filtered 105 frame data and/or metadata (e.g., blending coefficients), to the residual calculator module 107. The residual calculator module 107 then blends or interpolates between the various versions of the frame data to produce residual values that can be encoded by the encoding module 109. In order to perform the comparison with a future frame, during the encoding of a subsequent frame, the encoded frame is reconstructed by a frame reconstruction module 111 to produce reconstructed frames 113. Reconstructed frames 113 are derived from input data which was temporally filtered and put through the entire balance of the encoding process before being reconstructed. These reconstructed frames 113 are the previous frames to which the input frame data 101 is compared for motion processing module 103.

According to some embodiments, the temporally filtered 105 frame data may be virtual, i.e., the temporal filter module 105 provides filter coefficients as its output, and the actual filtering operation is performed on the fly together with residual calculation in the residual calculator module 107. According to other embodiments, the temporal filter module 105 applies suitable filter coefficients to the input frame data 101 to directly produce filtered frame data.

The various modules of FIG. 1 may be implemented as integrated special purpose hardware modules or as integrated software modules, or may be functionally broken down further for ease of implementation. For example, motion processing module 103 can be broken down into a separate motion estimation module and motion compensation module. See, for example, FIGS. 2, 210 and 220, respectively.

Figure 2:
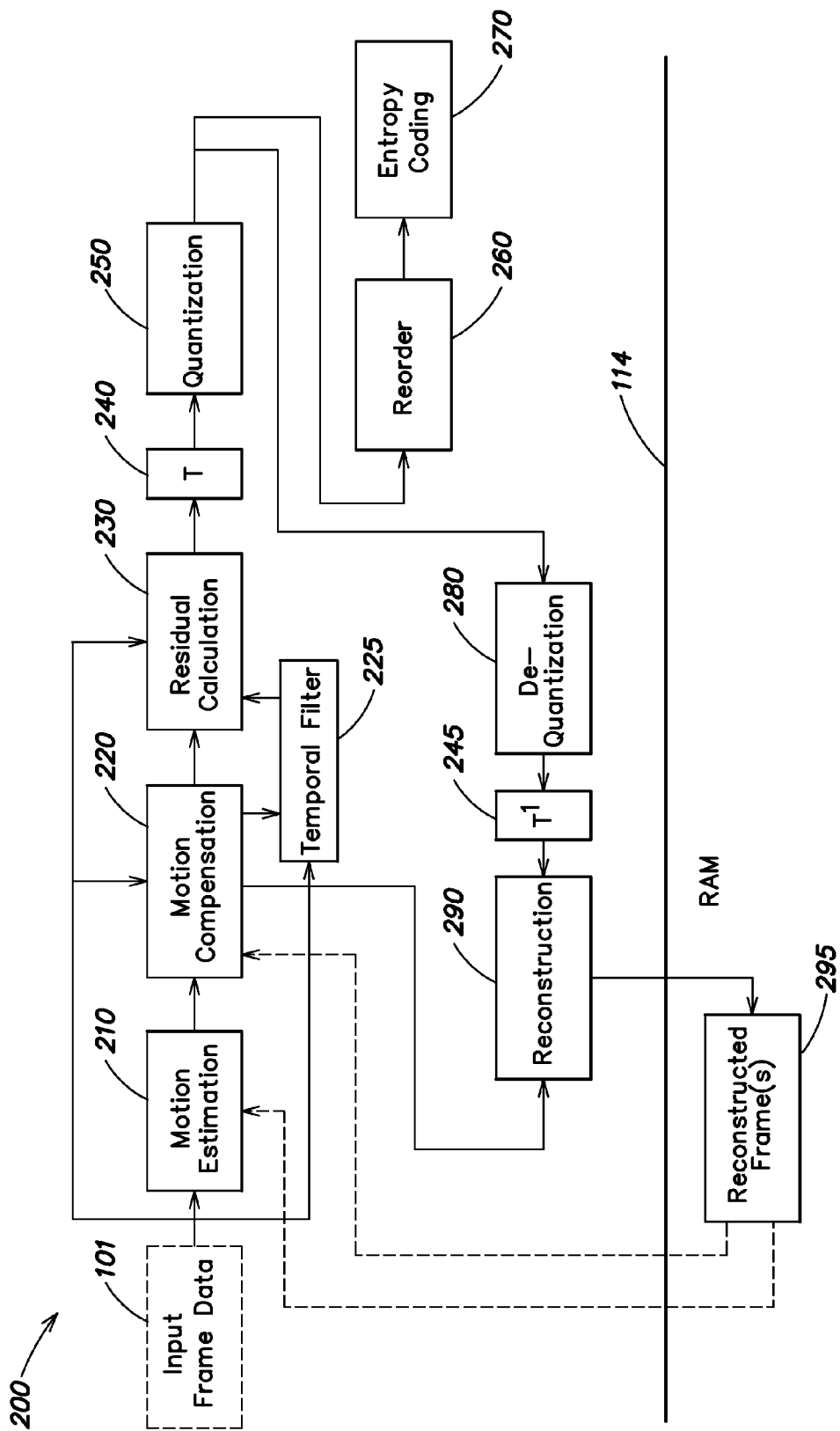
FIG. 2 is a more detailed block diagram of aspects of the embodiment of FIG. 1.

Aspects of an embodiment in which several of the modules of FIG. 1 are illustrated as separate modules implementing lower-level functionality are now described with reference to FIG. 2. The components shown in FIG. 2 have been individually described above. Alternative constructions for each of these blocks are known to those skilled in the art.

Frames are captured by the system 200 and provided as input frame data 101 to the motion estimation module 210, the output of which is coupled to the motion compensation module 220, which can also, optionally, receive directly the input frame data 101. Motion estimation is performed relative to previous frames in encoding order. The motion compensation module 220 performs interpolation, if necessary, and subtraction by residual calculation, in residual calculation module 230. In accordance with the invention, a temporal filter module 225 is coupled to the motion compensation module 220, and further receiving the input frame data 101, and providing the output to the residual calculation module 230. The temporal filter module 225 is enabled to check on some number of pixels, up to every pixel, whether and with which strength blending between the motion compensated reference and the current frame is applied. Blending may be applied to part of a frame or a whole frame, as desired. In contrast to prior art solutions, the residual calculation module 230 now uses the output from the temporal filter module 225 as well as the reference from motion compensation module 220 to perform the blending, and may further use the input frame data 101 to perform same. Therefore, in one embodiment the blending is performed by the temporal filter module 225. The system 200 then continues the regular compression flow through a transformation module 240, e.g., discrete cosine transform (DCT), quantization module 250, dequantization module 280, and inverse transform module 245, e.g., inverse DCT (IDCT). A reordering module 260, that performs reordering on residual coefficients, which is coupled to entropy coding module 270, is connected to the output of the quantization module 250. A frame reconstruction module 290 receives the output of the inverse transform as well as the motion compensated frame and may save the reconstructed frame 295 in memory 114. Memory 114 is further coupled to motion estimation module 210 and motion compensation module 220. Memory 114 may be an external or internal memory when the system 200 is implemented as an integrated circuit.

Figure 3:
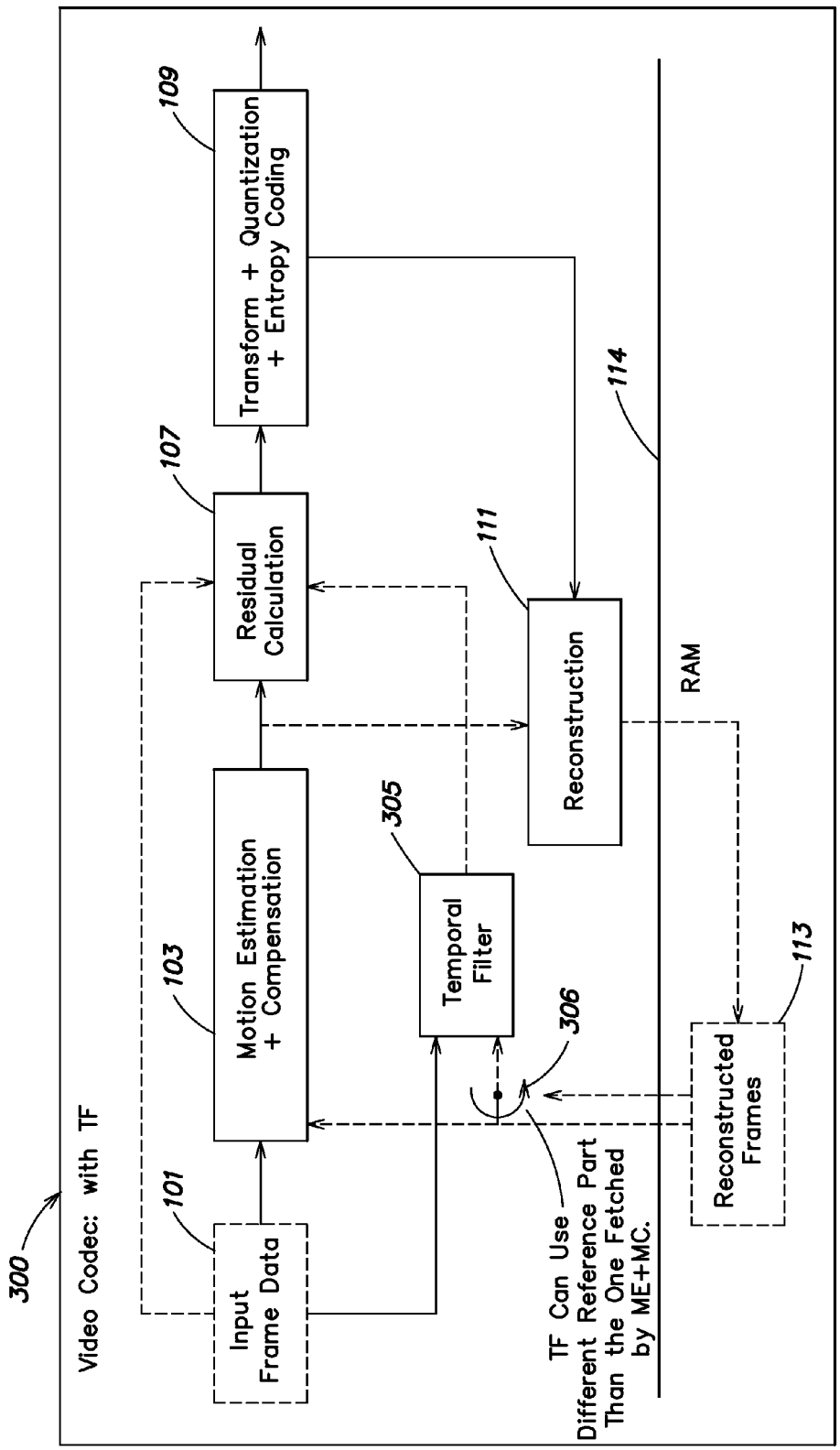
FIG. 3 is a block diagram of aspects of another embodiment.

A system 300 according to alternate aspects of an embodiment is illustrated in FIG. 3. The illustrated alternative allows different frames or portions thereof to serve as the reference frame in the motion estimation and motion comparison module or modules.

Frames are captured by the system 300 and provided as input frame data 101 to a motion processing module 103. The input frame data 101 is also provided to a temporal filter module 305 and a residual calculator module 107. The motion occurring between a previous input frame and the input frame data 101 currently being processed is estimated and compensation applied to each pixel of the reference frame, producing a compensated frame which is provided, along with the input frame data 101 and temporally filtered 305 frame data, to the residual calculator module 107. The residual calculator module 107 then blends or interpolates between the various versions of the frame data to produce residual values that can be encoded by the encoding module 109. In order to perform the comparison with the future frame, the encoded frame is reconstructed by a frame reconstruction module 111 to produce reconstructed frames 113. Reconstructed frames 113 are derived from input data which was temporally filtered and put through the entire balance of the encoding process before being reconstructed. These reconstructed frames 113 are the previous frames to which the input frame data 101 is compared for motion processing module 103. A switch 306 is provided, either in hardware or through the selection of memory locations to read using software, so that the reconstructed frames 113 provided to the temporal filter may be the same as those provided to the motion processing module 103, or may be reconstructed frames other than those presently provided to the motion processing module 103, or portions thereof stored in the memory 114, for example reconstructed frames having no motion compensation.

Figure 4:
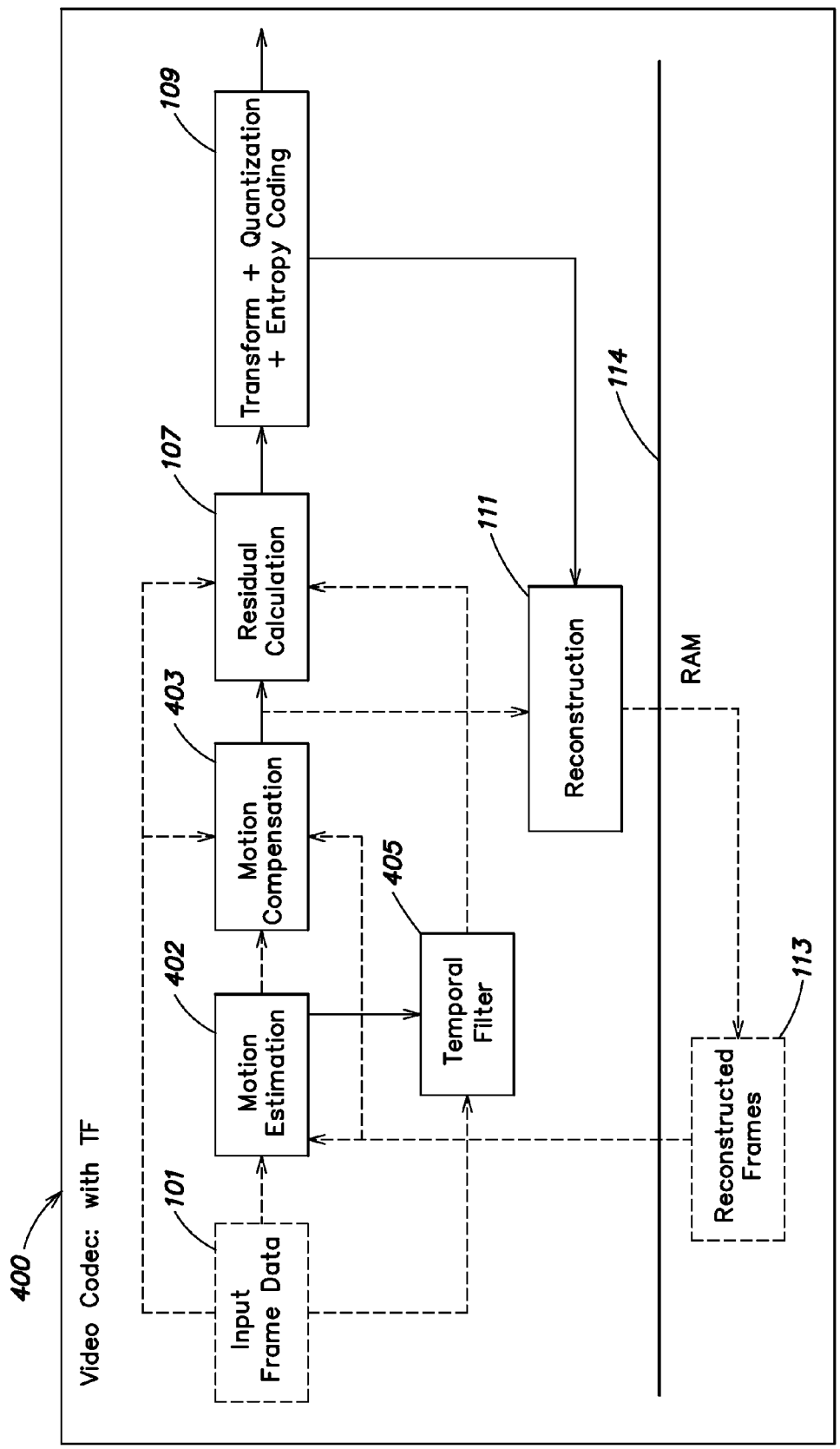
FIG. 4 is a block diagram of aspects of yet another embodiment.

A system 400 according to yet other aspects of an embodiment is shown in FIG. 4. In this embodiment, the temporal filter is receiving motion estimation information, rather than motion compensation information.

Frames are captured by the system 400 and provided as input frame data 101 to the motion estimation module 402, the output of which is coupled to the motion compensation module 403, which can also, optionally, receive directly the input frame data 101. Motion estimation is performed relative to previous frames in encoding order. The motion compensation module 403 performs interpolation, if necessary, and subtraction by residual calculation, in residual calculator module 107. In accordance with the invention, a temporal filter module 405 is coupled to the motion estimation module 402, and further receiving the input frame data 101, and providing the output to the residual calculator module 107. The temporal filter module 405 is enabled to check on every pixel whether and with which strength blending between the reference and the current frame-is applied. Blending may be applied to part of a frame or a whole frame, as desired. In contrast to prior art solutions, the residual calculator module 107, now uses the output from the temporal filter module 405 as well as the reference from motion compensation module 403 to perform the blending, and may further use the input frame data 101 to perform same. Therefore, in one embodiment the blending is performed by the temporal filter module 405. The system 400 then continues the regular compression flow through an encoding module 109. A frame reconstruction module 111 receives the output of the encoding module 109 as well as the motion compensated frame and may save the reconstructed frame 113 in memory 114. Memory 114 is further coupled to motion estimation module 402 and motion compensation module 403. Memory 114 may be an external or internal memory when the system 400 is implemented as an integrated circuit.

Figure 5:
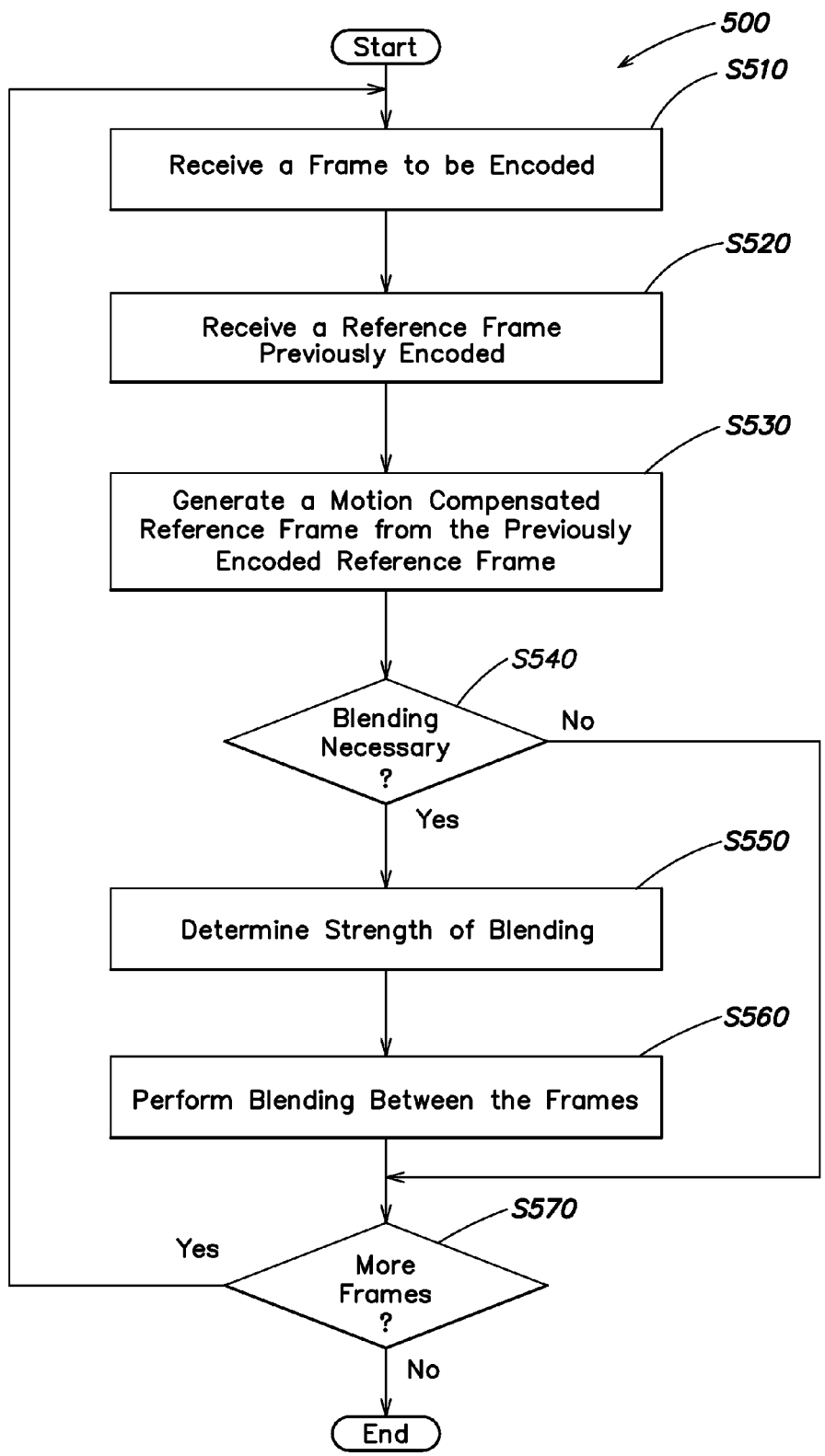
FIG. 5 is a flow diagram of yet other aspects of an embodiment.
Figure 6:
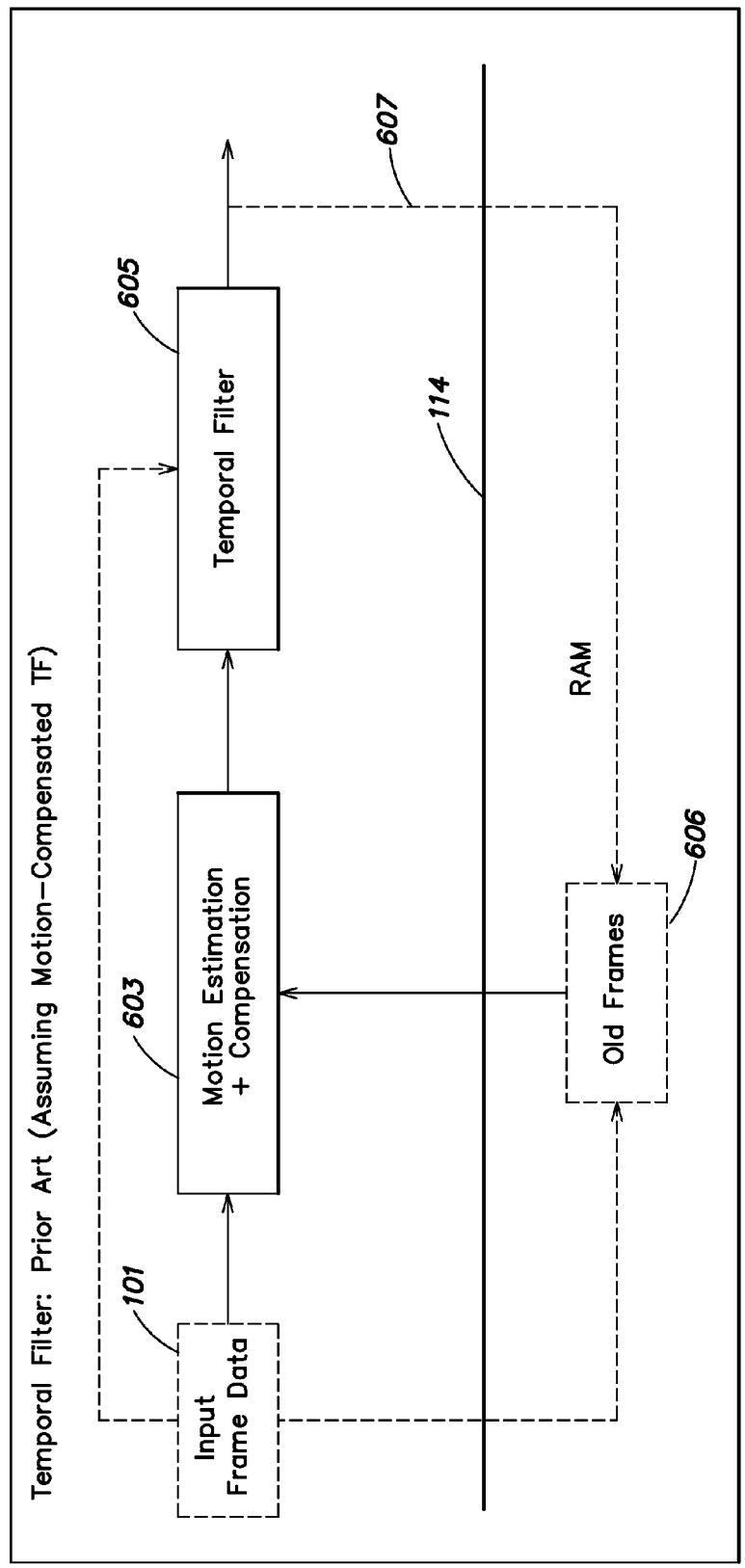
FIG. 6 is a block diagram of a conventional video encoder.
Figure 7:
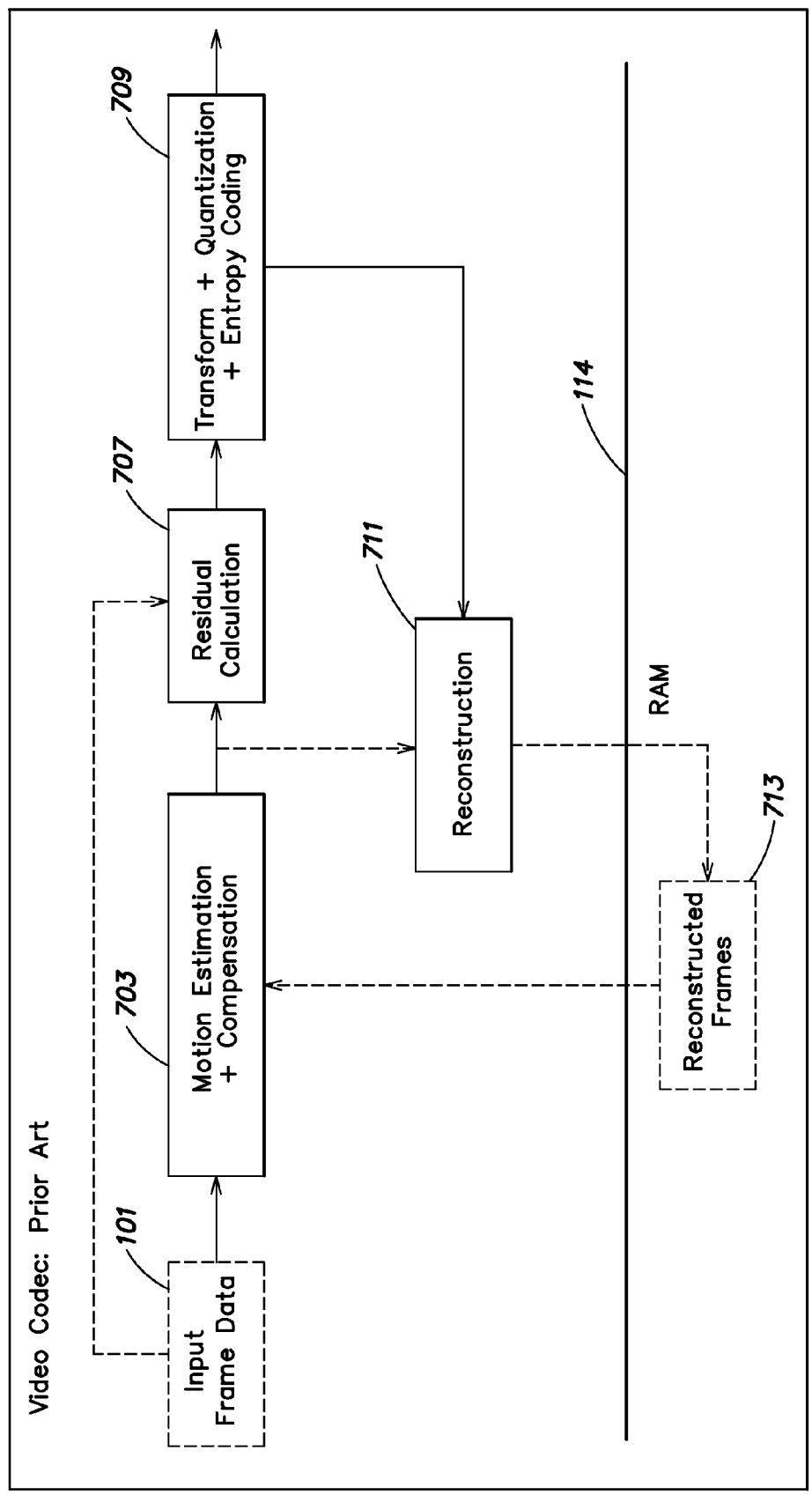
FIG. 7 is a block diagram of a conventional video codec.

The invention now enables the performance of video encoding with temporal filtering as further described with respect to flowchart 500 of FIG. 5. In S510 a frame to be encoded is received. In S520 one or more reference frames previously encoded are received. It should be noted that receiving such frames may be available from memory 114. In S530 a motion-compensated reference frame is generated from the reference frame by using motion estimation. In S540 it is determined if blending is necessary and if so execution continues with S250; otherwise, execution continues with S570. In S550 the strength of the necessary blending is determined. In one embodiment of the disclosed invention, and without intent of limiting its generality, the blending is performed until the pixel level. In S560 the blending between the frames is performed. In S570 it is checked whether additional frames need to be processed and if so execution continues with S510; otherwise, execution ends.

According to variations on the various embodiments described, generating the motion-compensated reference frame from the previously encoded reference frame can be done in parallel in the motion estimator module and motion compensator module, and in the temporal filter module provided the temporal filter module receives a different reference frame than the motion estimator module and motion compensator module.

Using the principles of aspects of embodiments, a substantial bandwidth savings is realized. Conventional systems require for the temporal filter a bandwidth of: input MB (384 Byte)+Ref MB (384 Byte)+out MB (384 Byte)=1.125 KB per MB. To that is added, as required for the video encoder, a bandwidth of: input MB (384 Byte)+Rec MB (384 Byte)+out Code per MB (~10 Byte)=0.76 KB per MB. Thus, the total bandwidth required for conventional systems is about 1.885 KB per MB. In contrast, the aspects of embodiments described above have a bandwidth requirement for the combined temporal filter and encoder of: input MB (384 Byte)+Rec MB (384 Byte)+out Code per MB (~10 Byte)=0.76 KB per MB. The bandwidth savings is about 60% using aspects of embodiments described above because the aspects of embodiments are only using about 40% of the bandwidth of conventional systems to accomplish similar results.

The lower bandwidth requirements described above can also contribute to a lower power consumption requirement for the encoding equipment. Lower bandwidth results in the individual switching elements of such equipment, for example individual transistors, operating more of the time in a more efficient operating region because they are operating at lower frequencies, than when they operate at very high frequencies to support high bandwidths.

An advantage of other aspects of embodiments is that lower bitrate video having high quality can be supported. The temporal filter can even be used by Bit Rate Control to reduce the bitrate without any substantial sacrifice of quality.

An advantage of yet other aspects of embodiments is higher perceived quality of video due to less noise and smoother transitions between frames.

Another advantage of yet other aspects of embodiments is a greater potential for reducing the number of bits required in the encoded stream, and so reducing the required bandwidth, due to temporal filtering reducing the amount of residual data required to be encoded to represent differences between a predicted current frame and an actual current frame, thus reducing the need for compression.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A video encoder with an integrated temporal filter, comprising:
   an input configured to receive input frame data;
   an output configured to provide a sequence of encoded frame data;
   a frame reconstruction module configured to receive a frame of encoded frame data from the sequence of encoded frame data and to provide reconstructed frame data;
   a temporal filter configured to receive the input frame data and the reconstructed frame data and to produce filtered frame data;
   a motion processing module configured to receive the reconstructed frame data and the input frame data and to provide motion compensated frame data;
   a residual calculation module configured to:
   (i) receive the motion compensated frame data and the filtered frame data, and
   (ii) blend, at the residual calculation module, the motion compensated frame data and the filtered frame data to produce a residual error signal, wherein blending the motion compensated frame data and the filtered frame data comprises applying one or more blending parameters to the motion compensated frame data and the filtered frame data, such that the residual error signal is bounded between values of the motion compensated frame data and the filtered frame data, and
   a coder module configured to receive the residual error signal and to produce the sequence of encoded frame data;
   wherein the temporal filter is configured to provide the filtered frame data by blending between the input frame data and the reconstructed frame data.

2. The video encoder of claim 1, further comprising:
   a switch by which the temporal filter is configured to receive either the reconstructed frame data provided to the motion processing module or alternately reconstructed frame data.

3. The video encoder of claim 1, wherein the temporal filter is configured to determine a strength level of the blending.

4. The video encoder of claim 3, wherein the blending is performed up to a pixel level.

5. The video encoder of claim 1, wherein the residual calculation module is configured to receive the input frame data.

6. The video encoder of claim 5, wherein the residual calculation module is configured to produce the residual error signal based on one of a difference between the input frame data and the motion compensated frame data and a difference between the filtered frame data the motion compensated frame data.

7. A method of encoding video, comprising:
   receiving input frame data to be encoded into a motion estimation module and a temporal filter;
   receiving a previously encoded frame;
   generating reconstructed frame data from the previously encoded frame;
   performing blending between the reconstructed frame data and the input frame data to generate filtered frame data;
   generating motion estimated and motion compensated frame data based on the reconstructed frame data; and
   generating a residual error signal by performing blending, at a residual calculation module, a plurality of input data signals comprising one or more of the input frame data, the motion estimated and motion compensated frame data, and the filtered frame data, wherein the blending comprises applying one or more blending parameters to the plurality of input data signals, such that the residual error signal is bounded between values of the plurality input data signals.

8. The method of claim 7, wherein the blending is performed up to a pixel level.

9. The method of claim 7, further comprising:
   generating a residual error signal based upon one of a difference between the current frame data and the motion estimated and motion compensated frame data and a difference between the filtered frame data and the motion estimated and motion compensated frame data.

10. A method for video encoding of video frames comprising:
    receiving input video frame data to be encoded;
    receiving a previously encoded reference frame;
    generating motion-compensated reference frame data from said previously encoded reference frame by using motion estimation and compensation;
    performing blending between said motion-compensated reference frame data and said input video frame data to generate filtered frame data; and
    generating a residual error signal by performing blending, at a residual calculation module, of one or more of the input frame data, the motion-compensated reference frame data, and the filtered frame data, wherein the blending comprises applying one or more blending parameters to the motion compensated frame data and the filtered frame data, such that the residual error signal is bounded between values of the motion compensated frame data and the filtered frame data.

11. The method of claim 10, wherein said blending is performed up to a pixel level.

12. A video encoder with an integrated temporal filter, comprising:
    an input configured to receive input frame data;
    an output configured to provide a sequence of encoded frame data;
    a frame reconstruction module configured to receive a frame of encoded frame data from the sequence of encoded frame data and to provide reconstructed frame data;
    a motion processing module configured to receive the input frame data and the reconstructed frame data and to provide motion compensated frame data;
    a temporal filter configured to receive the input frame data and the motion compensated frame data and to produce filtered frame data;
    a residual calculation module configured to (i) receive the motion compensated frame data and the filtered frame data, and (ii) blend, at the residual calculation module, the motion compensated frame data and the filtered frame data to produce a residual error signal, wherein blending the motion compensated frame data and the filtered frame data comprises applying one or more blending parameters to the motion compensated frame data and the filtered frame data, such that the residual error signal is bounded between values of the motion compensated frame data and the filtered frame data; and a coder module configured to receive the residual error signal and produces the sequence of encoded frame data;

wherein the temporal filter is configured to provide the filtered frame data by blending between the input frame data and the motion compensated frame data.

13. The video encoder of claim 12, wherein the temporal filter is configured to determine a strength level of the blending.

14. The video encoder of claim 13, wherein the blending is performed up to a pixel level.

15. The video encoder of claim 12, wherein the residual calculation module is configured to receive the input frame data.

* * * * *